June 25, 1935. B. H. KERSTING Re. 19,623
DRUM WEIR
Original Filed Sept. 20, 1933 4 Sheets-Sheet 1
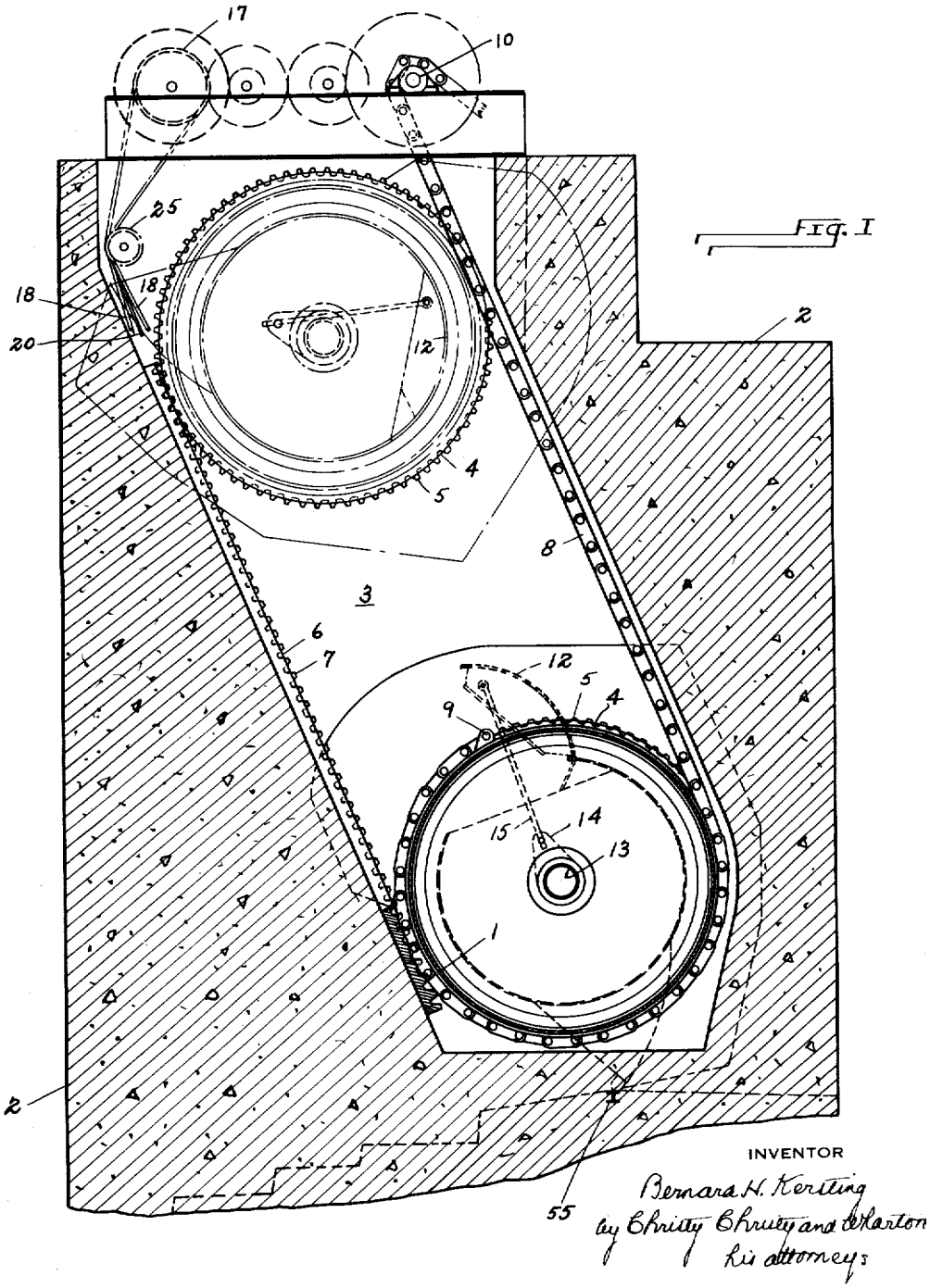
INVENTOR
Bernard H. Kersting
by Christy Christy and Clarton
his attorneys June 25, 1935. B. H. KERSTING Re. 19,623
DRUM WEIR
Original Filed Sept. 20, 1933 4 Sheets-Sheet 2
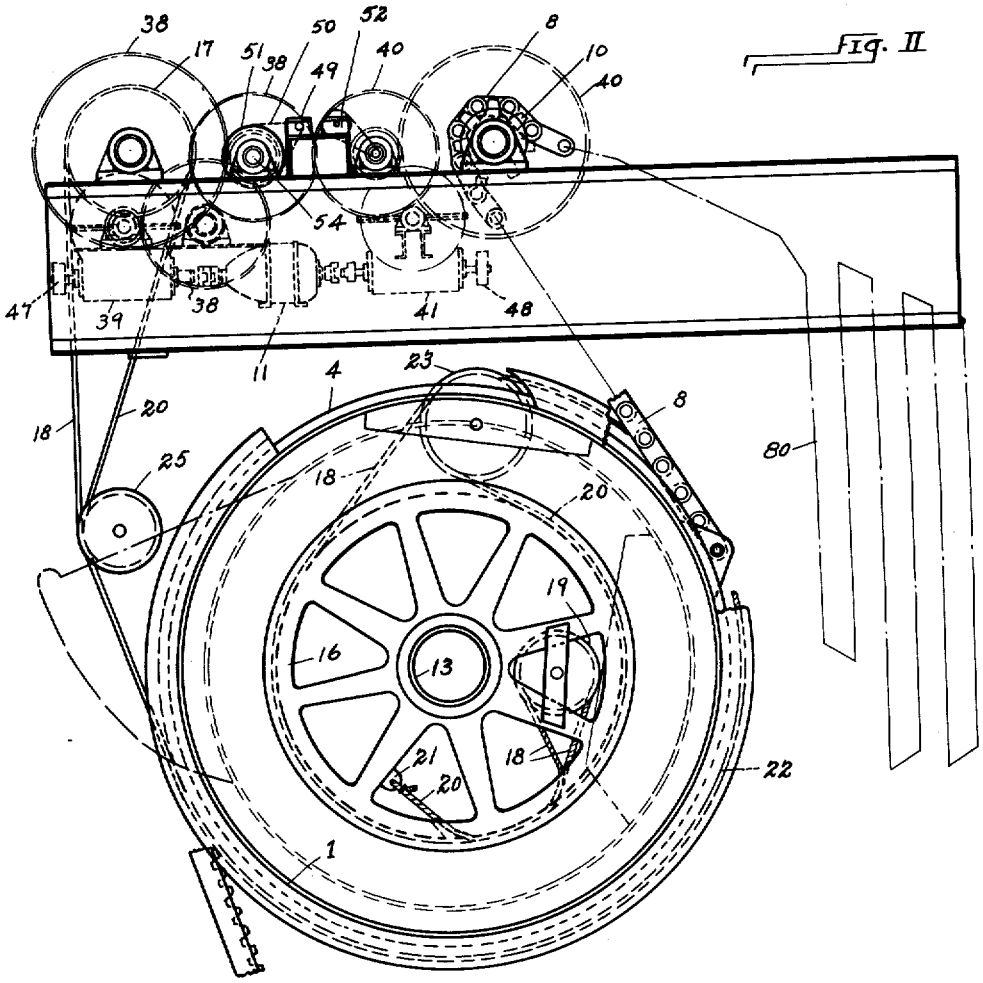
Fig. II
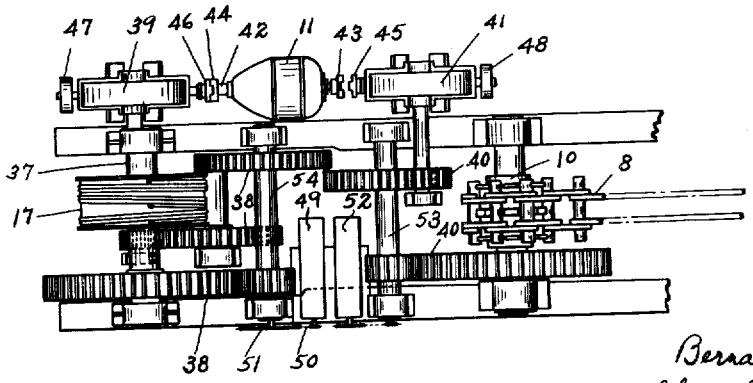
Fig. III
INVENTOR
Bernard H. Kersting
by Christy Christy and Wharton
his attorneys June 25, 1935. B. H. KERSTING Re. 19,623
DRUM WEIR
Original Filed Sept. 20, 1933 4 Sheets-Sheet 3
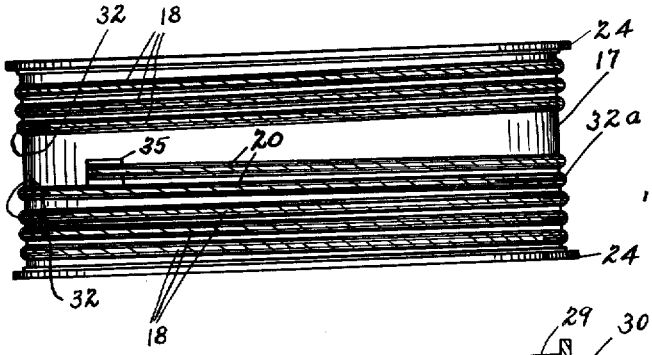
Fig. V
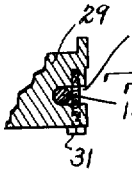
Fig VII
Fig. VI
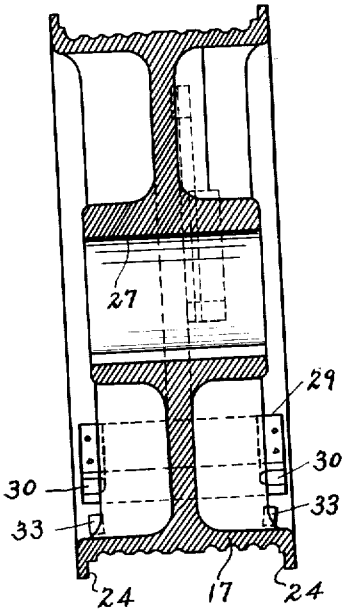
Fig. IV
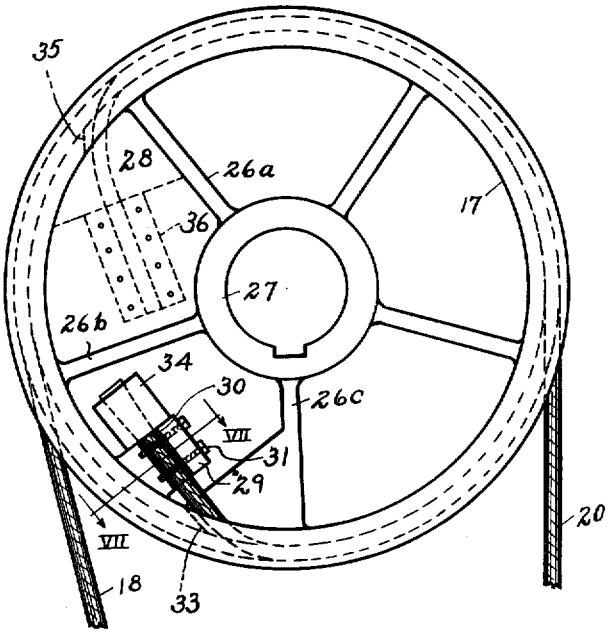
INVENTOR
Bernard H. Kersting
by Christy Christy and Wharton
his attorneys June 25, 1935. B. H. KERSTING Re. 19,623
DRUM WEIR
Original Filed Sept. 20, 1933 4 Sheets-Sheet 4
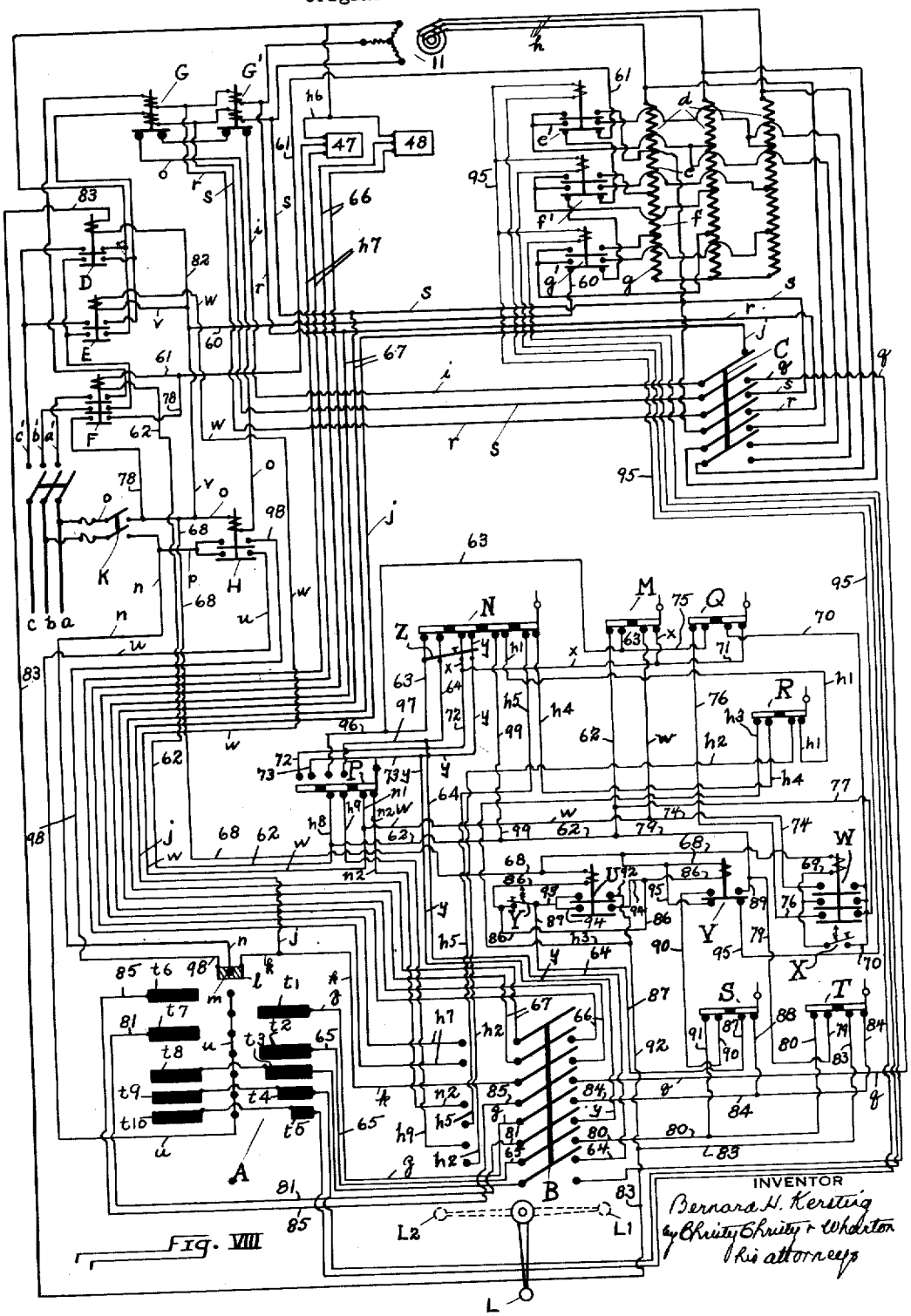
Fig. VIII Reissued June 25, 1935 Re. 19,623

UNITED STATES PATENT OFFICE 19,623

DRUM WEIR

Bernard H. Kersting, Ben Avon, Pa., assignor to The Dravo Contracting Company, a corporation of Pennsylvania Original No. 1,952,501, dated March 27, 1934, Serial No. 690,173, September 20, 1933. Application for reissue March 8, 1935, Serial No. 10,061

16 Claims. (Cl. 61—22)

The invention relates to drum weirs and particularly to drum weirs of the type in which the drum is equipped with a flap capable of being swung from collapsed to extended position, and it consists in improvements in the means employed to raise and lower the drum, and to swing the flap. In Letters Patent No. 1,922,097, granted to me August 15, 1933, a drum weir is described in which two motors are employed, one of the motors being serviceable to raise and lower the drum, and the other to raise and lower the flap with which the drum is equipped. As a matter of fact, the loads imposed upon the two motors in their several operations are widely different in value.

More particularly my invention consists in the provision of means which adapt a single motor to perform both of these two unequal operations adequately and efficiently. The invention is found specifically in control mechanism which adapts the motor to the particular service required of it.

In Fig. I of the accompanying drawings, a drum weir and its setting are shown in vertical section. Fig. II is a fragmentary view to larger scale, showing in side elevation the operating apparatus for the drum. Fig. III is a view in plan from above of the last-named apparatus. Figs. IV, V, and VI are views in side elevation, in plan from above, and in axial section, of the drum that carries the flap-swinging lines. Fig. VII is a sectional view in detail, on the line VII—VII of Fig. IV. And Fig. VIII is a wiring diagram.

Referring to Fig. I, a drum weir is shown in vertical section. The drum 1 of the weir, according to usual practice, extends between two piers 2 (only one pier appears in Fig. I), and at its ends the drum extends into recesses 3 formed in the opposed faces of the two piers. These recesses are elongate and extend in parallelism obliquely to the vertical, and along their extent the drum may be rolled. The drum at its ends is provided with treads 4 and pinions 5, and along their lower longitudinal sides the recesses 3 are provided with rails 6 and racks 7. With these rails and racks the treads 4 and pinions 5 make engagement. The drum is raised and lowered by rolling along rail 6. A sprocket chain 8, anchored at 9 to the drum, encircles the drum when in lowered position and extends thence around a sprocket-wheel 10 of a winch, cf. Figs. II and III. As seen in Fig. I, the chain 8 extends from its anchorage 9 in counterclockwise direction of turn around the drum, and thence to the winch in a line that is tangent to the drum; the chain leaves the drum at a point on the side that is the outer or upper side with respect to the rails 6. The sprocket-wheel is journaled in stationary bearings in one of the piers 2, adjacent the upper end of the recess 3. A motor 11, Fig. III, is adapted to drive the sprocket-wheel, and, as the sprocket-wheel turns within the established range, the drum is raised from and lowered to active position. The recesses 3 with their rails 6 constitute guideways for the drum; the drum moves in a plane with which its axis is coincident and in a direction perpendicular to its axis, and as it so moves it rotates.

Upon the drum is mounted the usual swinging flap 12. In Fig. I the drum is indicated in full lines at the lower limit, and in broken lines at the upper limit, of its range of travel; in the lowered position of the drum the flap 12 is shown (in dotted lines) in raised position; while in the upper position of the drum the flap is shown in collapsed position.

The means for raising and lowering the flap include a tortion member arranged within and extending longitudinally of the drum. Specifically, as here shown, a hollow shaft 13 is axially arranged within the drum. The shaft is equipped with cranks 14, and links 15 connect the flap with the cranks. These parts are so proportioned and arranged that when by the turning of the cranks the flap comes to elevated position the pivot points at the ends of the link come to, or substantially to, or perhaps slightly beyond, positions of radial alignment with the cranks 14, with respect to the axis of turning, as indicated in association with the drum as shown in the lowered position in Fig. I.

Upon one end of the shaft 13, as seen in Fig. II, a wheel 16 is rigidly mounted. The drum 17 of a winch is mounted on the same pier 2 as that upon which the sprocket-wheel 10 is rotatably borne. Upon this drum 17 two tension members, shown in the form of cables, are oppositely wound. In consequence of this opposite winding, the turning of the winch alternately in opposite directions effects the alternate winding up of one or the other of the two cables, while at the same time and to equal degree the companion cable is paid out. One of these two cables, cable 18, is double, and, partially encircling the rim of wheel 16, it forms a bend about a sheave 19 idly mounted on wheel 16; the other cable, cable 20, extends in a single strand; it partially encircles in opposite direction the rim of wheel 16; and it is anchored in the wheel at 21. It will be perceived that, by powerfully rotating the winch, the wheel 16, and with it the shaft 13, may be rotated, and that it is a matter of proportioning and adjustment and control of the winch-rotating means to effect the timely swinging of the flap between raised and collapsed positions. And it will be perceived that, inasmuch as relatively great force is requisite to raise the flap against the current of a flowing stream, while relatively little force is required to collapse the crank-and-link connection, the flap-raising cable 18 is made double with advantage, while the cable 20 is single. The sheave 19 is effective to adjust the pull and to effect an equalizing of strain upon the two reaches of cable 18. (As disclosed in my above-noted patent, chains may be used, instead of cables.) Such a particular arrangement of the cables, with an accommodation to the disparity between the strains to which they severally are subject, permits the employment of strands for the two cables of equal diameter.

As will presently appear, the winch drum 17 is operatively independent of the sprocket-wheel 10. It follows from this that, when the weir drum has been brought to lowered position, not only may the flap be raised, it may be raised to any desired position within its range of swing, and there maintained. And, further, in the lowering of the flap, if, perhaps, under conditions of service, obstruction may have accumulated beneath the flap, say, in the form of ice, the flap may be lowered so far as the presence of such obstruction permits, and then the drum itself may be raised, even though the flap should not be completely collapsed. And in such drum raising, the flap and the flap-swinging apparatus are not subjected to undue stresses.

The flap-swinging cables, it will be understood, extend from the winch 17, over sheaves 25 idly mounted at the top of pier 2, to a point of tangency with the weir drum, and thence encircle the drum, cf. Fig. II. This tangency with the drum is on the side opposite that of the sprocket chain 8. It follows that no stretching of the chain 8 can be effective to disturb the proper operation of the flap-swinging cables, nor impose upon them any part of the weight of the drum itself.

Provision is made that as the drum is raised and lowered the slack of the cables 18 and 20 shall be properly taken care of. To such end the wheel 16 (which, on that account, is of relatively smaller size) is contained within and is encircled by the drum, and the drum carries integrally a collar 22 which has an effective face of equal diameter with the face of the tread 4. The weir drum 1 and the collar 22 are ported, to allow the extension through of cables 18 and 20; and in the port a guiding device is set, in the form of sheaves 23 idly mounted, and around them the cables 18 and 20 are bent and from them the cables extend in such manner that they encircle the wheel 16 in opposite directions. The cables extend upward from the collar 22, cf. Fig. II, to the sheaves 25, and in the reach between sheaves 25 and the weir drum the cables extend in side-by-side positions.

It will be perceived that as the weir drum is rolled up and down (the flap-swinging winch being at the time at rest) the cables 18 and 20 wrap themselves upon and unwrap themselves from the collar 22; and that, since the collar is of equal effective diameter with the tread 4, and since the cables (equal in diameter) extend in side-by-side positions, the cables are laid down upon the collar and raised again without access of or disturbance of tension, in consequence of either the raising or lowering of the drum. Careful consideration of Fig. I will make plain the fact that in the installation illustrated the drum turns through about three quarters of one complete rotation, in passing from the lowered to the elevated position. It may be remarked that the extent of the collar 22 is not less (indeed, it is somewhat more) than three quarters of a circumference; and that when the drum is in its lowered position the cables meet the sheaves 23 on a line that is tangent to the curved face of collar 22. This feature of construction is described in greater detail in my patent on drum weir, above noted. In consequence, as the drum rises (turning counterclockwise) the cables are laid down accurately upon the cylindrical face of collar 22. In Fig. I, the flap-operating cables are shown diagrammatically, diverging downward from engagement with sheave 25. This diagrammatic showing is intended merely to indicate the multiplicity of reaches of cable. There is no such divergence in actual positions. Fig. II is a view in side elevation, and in it, and in all operating positions of the apparatus, the reaches of cables 18 and 20, between sheaves 25 and collar 22, lie in lines which, from this point of view, are coincident.

When the drum is in lowered position, the full-line position in Fig. I, the flap 12 is on the upper side, at the crown of drum curvature, and the break in collar 22 (Fig. II) is so situated that cables 18 and 20 extend in free and direct reaches from idler sheaves 25 at the upper range of drum travel to tangency upon sheaves 23. The parts being in such positions, and the flap being collapsed, tension exerted upon cables 18 by rotation of drum 17 clockwise will effect clockwise turning of wheel 16 (Fig. II) and of the shaft 13 upon which the wheel 16 is integrally mounted. In consequence, the cranks 14 (Fig. I) are turned clockwise and the flap 12 is swung to raised position. This raising of the flap will commonly be effected against the opposing force of the flowing stream across which the weir structure is erected, and accordingly the double cable 18 is made strong to transmit the necessary force. As the flap comes to this elevated position (cf. the lower position of the drum in Fig. I) the toggle formed by cranks 14 and links 15 straightens out. Consequently, the flap will stand in elevated position, without the necessity of the continued application of force to maintain it. When the flap is to be lowered, the force of the flowing stream (if present) is not opposing, but is cooperative, in its effect; there is needed but a relatively light pull to collapse the toggle; and this is accomplished by the counter-clockwise turning of wheel 16, in response to the counter-clockwise rotation of the winch drum 17 and the tension of the single-strand cable 20.

It will be understood that the flap may be raised from collapsed position to any particular point in its range of swing, and there maintained by tension upon double cable 18. As the weir drum is rotated and rolls along tracks 6, to bring it to the desired position of adjustment, the cables 18 and 20 will wrap upon and unwrap from the collar 22; the flap-swinging apparatus will not interfere with the operation of drum raising; and the movement of the drum will have no effect to collapse or to change the tension upon the flap-swinging cables. As in the course of rise of the drum the collapsed flap comes to the under side of the drum, it cannot swing in response to gravity; the flap-closing cable 20, extending taut upon collar 22 and thence around one of the sheaves 23 and thence to the winch, is effective to prevent such swinging. And if, when the drum is to be raised, the flap should be standing in raised position, or any other position, still the raising of the drum may be effected, and in the raising no prejudicial strains will be exerted upon the flap or upon the flap-swinging apparatus.

In Fig. II, I show diagrammatically at 80 loops of the slack portion of the sprocket-chain 8, accumulated in the raising of the drum on a rack in the usual and well-known manner.

Upon turning to Figs. IV–VI, it will be observed that the cylindrical face of the winch drum is helically grooved to receive the cables 18, 20. Spokes 26 unite the hub 27 with the drum body 17, and between two of the spokes, 26*a* and 26*b*, an integrally formed web or wall 28 extends. Between spokes 26*b* and 26*c*, a block 29, integral with the body of the drum, is set. The block 29 extends substantially throughout the length of the drum (cf. Fig. VI). At its ends the block is provided with slots 30, and keeper screws 31 cooperate with each slot, to form rope clamps at the ends of the block. The two strands of cable 18 extend from sheaves 25 to tangency with the drum at the spaced-apart points 32 (cf. Fig. V), whence they lie, wrapped in opposite helical paths, upon the drum. The drum is ported at 33, 33 (Fig. IV) adjacent its end flanges 24, and the two strands of cable 18 pass severally through these ports to anchorage in the block 29. To the ends of the two strands stops 34 may be secured, and the cable ends lie in the slots 30, the stops 34 abutting upon block 29. The anchorage is made secure by the application of screws 31. Cf. Figs. IV and VII.

The flap-closing cable 20 extends from one of sheaves 25 to tangency with the drum 17 at the point 32*a*, between the wrappings of the two strands of cable 18, and from this point of tangency cable 20 lies wrapped upon the drum to a port 35, extending through the cylindrical body of the drum. Through such port the cable extends to its anchorage, upon web 28. Thus it will be seen that the two cables extend from their several anchorages, in oppositely directed wrappings, upon the drum; and in consequence, upon rotation of the drum in one direction or the other, one cable is paid out while the other is wound in, to effect the alternate raising and lowering of the weir flap 12.

A motor 11 is provided, and this single motor is by my invention made adequate and effective, both to raise and lower the weir and to raise and lower the flap with which the weir is equipped. Aligned with the driven shaft 42 of the motor is a shaft that is provided with a worm; and the worm upon such shaft meshes with a worm-gear within a transmission box 41 of usual construction; from the worm-gear within the transmission box, through a train 40 of reduction gear-wheels, the shaft of sprocket wheel 10 is rotated. Aligned with the driven shaft of the motor is a second shaft that is provided with a worm; and the worm upon such second shaft meshes with a worm-gear within a second transmission box 39; from the worm-gear within this second transmission box, through a train 38 of reduction gear-wheels, the shaft 37 of drum 17 is rotated. Clutches 43, 45 and 44, 46 are effective to establish driving connection between the motor shaft 42 and one or the other of the aligned shafts through which the members 10 and 17 are alternately driven. The clutch elements 43, 44 are splined to the motor shaft 42 and are adapted to move jointly in either direction on the axis of the shaft, so that alternately the two clutches may be closed. Accordingly, the worm gears within the transmission boxes 41, 39 may alternately be made responsive to the drive of motor 11, and alternately the sprocket-wheel 10 or the winch drum 17 may be powerfully driven. And, the motor-shaft 42 being susceptible in motor operation to rotation in either direction, the members 10 and 17 may be driven at will in either direction.

An electrically released brake 48 is organized with the drive shaft of transmission box 41, and a brake 47 with the shaft of transmission box 39. Normally, these brakes are in applied positions, and are effective (the associated clutch being open) to prevent rotation, one of the sprocket-wheel 10, the other of the drum 17; and, subject to the control of apparatus presently to be described, the brakes are severally adapted to be released when the associated clutch is closed. Accordingly, when by the closing of clutch 43, 45 the motor is made effective to drive sprocket-wheel 10, the brake 48 is released; and when by the alternate closure of clutch 44, 46 (the position shown in Fig. III) the motor is made effective to rotate drum 17, it is the brake 47 that is released. The opening of either clutch is accomplished by a simultaneous operation of parts that allows the associated brake to become effective again.

In a housing 49 (Figs. II and III) a limit-switch mechanism is organized; the mechanism is of the well-known structure, and a detailed description of it is deemed unnecessary. Suffice it to say that the mechanism includes a threaded shaft which carries a nut that travels forward or backward as the shaft rotates in one direction or the other. The threaded shaft of the switch mechanism derives rotation from a sprocket chain 50, driven by a wheel 51 which is secured to a shaft 54 of the gear train 38 for driving the winch drum 17. As the winch drum is rotated in one direction or the other, the shaft of the switch mechanism is correspondingly rotated, and the traveling nut (not shown) is caused to move forward or backward, as the case may be. As the nut travels, it is effective to make and break electric circuits, and the specific circuits controlled by the switch mechanism 49 will be found in the wiring diagram, described below. A second limit-switch mechanism arranged in a housing 52 is similarly organized with a shaft 53 of the gear train 40 through which the sprocket-wheel 10 is driven.

Referring to the wiring diagram, Fig. VIII, the motor 11 and the two brakes 47 and 48 are shown in conventional manner. A master controller A and two transfer switches B and C are located in the operator's cab (not shown). The operator's cab may be erected on one of the piers 2 of the weir structure, or at such other point as may be convenient, to afford the operator a clear view of the weir structure. The transfer switch B (Fig. VIII) and the two clutches 43,45 and 44,46 (Fig. III) are jointly operated by a single lever L having three positions. The means for connecting the clutches and transfer switches B to the lever L are not shown, their provision being merely a matter for the engineer. The lever L is in Fig. VIII shown in neutral position in full lines, in which position the transfer switch B, movable between two circuit-closing positions, stands in intermediate or open position, while both clutches 43,45 and 44,46 stand in open positions. Upon swinging the lever to the right—to the dotted-line position L1—the clutch 43,45 is closed, and the switch B is shifted, establishing driving connection from the motor 11 to the sprocket-wheel 10, for raising and lowering the weir drum. When the lever L is swung to the opposite positioin, L2, the clutch 43,45 being open, the clutch 44,46 is closed, and the switch B is shifted, establishing driving connection from the motor 11 to the flap-operating drum 17, so that the control circuits for the operation of the flap 12 are closed.

The motor 11 is a three-phase induction motor having resistance units *d, e, f,* and *g* in its rotor circuit *h*, and, subject to the movement of controller A, such resistance units are adapted to be successively shorted out of the circuit *h*, by means of resistance relays *e'*, *f'*, and *g'*. The field windings of the motor are connected to the lines *a*, *b*, and *c* of a three-phase power supply, and the leads *a'*, *b'*, and *c'* from the power lines to the motor include in well-known manner three relays D, E, and F. The energizing of the relays D, F causes such relays to connect the power lines with the motor to produce rotation in one direction, and the energizing of the relays E, F effects the connection of the motor with the power lines to produce rotation of the motor in opposite direction. In the leads running from the relays to the motor, two overload relays G and G' are included.

The overload relay G is adapted to remain closed for all currents which will be safe for the motor; the overload relay G' is more sensitive than G, and is adapted to open and to effect deenergizing of the motor at a much smaller maximum current value; the purpose of relay G' being to limit to such smaller value the current which the motor receives during flap-swinging operation. As will presently appear in greater detail, the torque of the motor during the operation of the flap is limited to a value much lower than the torque necessarily developed during drum operation; and thus the motor with its double adaptability is prevented, when in service for swinging the flap, from causing injury to the flap-operating mechanism, in case some mechanical trouble or some obstruction should interfere with operation. An under-voltage relay H protects the structure in any case against a failure of power supply or against the condition in which the voltage falls to such value that the torque generated by the motor is uncertain or insufficient to do the work required of it. When such condition prevails, the relay H opens and effects the simultaneous deenergizing of motor 11 and of the means by which one of the brakes (47 or 48) is at the time held in release position. When the motor is to be used in its flap-operating capacity, the switch C is in its illustrated position, and two phases of the current for the motor flow through the coils of both overload relays G,G'; and then G', being the more sensitive of the two, is actually the effective relay. However, during the shifting of the weir drum, the load on the motor is much greater, and the main concern under such circumstances is not primarily the safety of drum-operating structure, but the protection of the motor against overload. The relay G then is alone effective, and it is designed to open only in case the current flowing becomes so great as to be dangerous to the motor. During operation of the weir drum 1, the switch C is in the position alternate to that shown in Fig. VIII, and the coils of relay G' are then shorted out of the circuit, by the lines *r* and *s*. By such provision it is that the more sensitive relay G' is effective only during the time when the motor is connected to perform the lighter of the two duties for which it is serviceable.

The operation of the apparatus to effect movement of the weir drum is as follows. The operator first places the controller A in the "off" position illustrated in Fig. VIII. He then closes the transfer switch C across its six pairs of contacts, and throws the lever L to position L1, thus closing clutch 43,45, and closing the arms of the switch B with its eight contacts on the right. He then closes the knife switch K, and establishes a circuit running from power line *a* through wire *o*, wire *i*, switch C, wire *q*, transfer switch B, wire *k*, contact plate *l*, contact finger *m*, and wire *n*, to power line *b*, whereby relay H is energized. When the relay H has been closed, the line *n* is shunted out by a wire *p*, running through the upper pair of contacts of relay H and through line 93 to the contact plate *l* of the controller A. Accordingly, when the relay H has once been closed, the controller may be shifted from "off" position without disturbing the energizing circuit of such relay. Let it be supposed that the weir drum is at the lower terminus of its travel, that the flap 12 is in closed position, and that it is desired to raise the drum to the top of the piers 2 or to some intermediate position. The apparatus is now in condition to respond to controller A.

The operator rotates the controller in such direction that the contact plates *t1*, *t2* are united with conductor *u*. In consequence, the relays E and F are energized; relay E is energized by a circuit running from power line *a* through wire *o*, wire *v*, wire *w*, limit switch M, wire *x* limit switch N, wire *y*, switch B, wire *z*, plate *t1*, conductor *u*, relay H, wire *p* to power line *b*; and relay F is energized by a circuit running from power line *a*, through wire *o*, wire *v*, wire 60, in series through the lower pairs of contacts in resistor relays *g'*, *f'*, *e'*, wire 61, through the magnet coil of the relay F, wire 62, limit switch M, wire 63, limit switch N, wire 64, transfer switch B, wire 65, controller plate *t2*, wire *u*, relay H wire *p*, and power line *b*. When relay F has been closed, its energizing circuit is by-passed through its own lower pair of contacts and wire 78, so that the resistor relays *e'*, *f'*, *g'*, may be operated without disturbing the relay. Accordingly, relays E and F are closed, and the motor 11 is energized for rotation in such direction as to turn the sprocket-wheel 10 clockwise, Fig. II, and to raise the weir drum 1. For convenience in the ensuing description, it will be assumed that clockwise rotation of the motor effects clockwise rotation of the sprocket-wheel and the raising of the weir drum.

It will be understood that, when the transfer switch C is closed across its six contacts (for weir drum operation), the more sensitive overload relay is (through *r*, *s*) shunted out of the motor-energizing circuit, and, further, that the upper resistance unit *d* is shorted out of the rotor circuit *h*. This is apparent in the wiring diagram, and no detailed tracing of the circuit is necessary. Then, simultaneously with the energizing of the motor 11, the brake 48 is energized and shifted to release position. One electric terminal of the brake is connected with the upper lead of the motor-enerizing lines, and the two other terminals of the brake are connected, by wires 66, transfer switch B, wires 67, and wires *r*, *s*, with the two other energizing leads of the motor. Thus the brake 48 is released, and the motor 11 rotates. The controller A may now be rotated by the operator, to move the contact plates *t3*, *t4*, *t5*, successively into engagement with the contact fingers of the drum; so that, in accordance with well-known practice, the resistor relays *g'*, *f'*, *e'* are successively closed, successively shorting out the resistance units *g*, *f*, *e*, and effecting acceleration of the motor in its clockwise rotation. The chain 8 is drawn upward, and the weir drum 1 is rolled upward upon the tracks 6.

The rotation of the motor 11 and the upward movement of the weir drum continue until the drum is approaching the upper limit of its range of travel (the position in which it is shown in broken lines, Fig. I). The limit-switch mechanism enclosed in housing 52, Figs. II and III, and adapted to protect the operation of the structure during the raising and lowering of the drum, consists in fact of several limit switches which in Fig. VIII are diagrammatically indicated by the reference characters M, N, Q, S, T. As the drum approaches the upper limit of its range, the limit switch M is automatically swung. The swinging of switch M opens the energizing circuits of the relays E, F; whereupon the motor is deenergized and stops, and the means for holding the brake 48 in release position are deenergized, and the brake is freed and allowed to return to applied position. In practice the drum is secured in its elevated position by mechanical stays or hooks (not shown), and in bringing such stays into effective position it is frequently necessary to raise the weir drum a few inches beyond the point to which, in response to the opening of limit switch M, it had come. To accomplish such additional rise of the drum a push-button X is provided, to by-pass the open limit switch M, and to permit further manually effected energizing of the motor for clockwise or drum-raising rotation. The closing of the push-button completes a circuit running from power line *a*, through line *o*, line 68, magnet coil of a relay W, line 69, push-button X, line 70, limit switch Q, wire 71, wire *x*, wire 72, limit switch P (which is normally in the upper of its two positions), wire 73, wire *y*, transfer switch B, wire *z*, contact plate *t1*, wire *u*, relay H, and wire *p*, to power line *b*. When once the push-button X has been closed and the relay W energized, the energizing circuit for the relay (W) is shunted through the middle pair of contacts of such relay, and the relay remains closed. It is not necessary to continue to hold the push-button down. Relay W is thus energized; it closes and shunts out one pair of contacts of limit switch M through the wire 71, limit switch Q, and wire 70, and 74, while the other pair of contacts of limit switch M is shunted out by wire 75, limit switch Q, and wires 76 and 77. In so shunting out the limit switch M (by closing push-button X), the relays E, F are again energized, so that the raising of the drum may be continued in the manner already described. Of course, such additional raising of the drum may be safely conducted only through an interval of a few inches (since the drum is located adjacent the upper end of its permissible range of travel); and, to safeguard against movement of the drum beyond such upper limit of its range of travel, the limit switch Q is provided. Switch Q opens as the drum reaches such upper limit, whereupon the relays E, F are deenergized, and the operation terminated.

Since this additional raising of the drum is through an interval of only a few inches, it may not be necessary to accelerate the motor by "stepping" the controller plates *t3*, *t4*, *t5* successively into contact with the conductor *u*. However, before closing the push-button X, it is desirable for the operator to restore the drum of controller A to such position that the contact plates *t4* and *t5* are freed from communication with the conductor *u*, so that there shall be at least two of the resistance units *d*, *e*, *f*, *g* in the motor circuit *h* when, in response to the closing of switch X, the motor is energized. This prevents any tendency for excessive current to flow through the motor when the weir drum is moved upward from its intermediate or temporary position of rest, described above.

In general, the lowering of the drum is effected in like manner as the raising. The relay H is first energized in the manner already described. Then the controller A is rotated to move the contact plates *t6*, *t7*, *t8*, *t9*, *t10* into engagement with the contact fingers of the drum which are interconnected by conductor *u*. Thereupon relays D and F are energized, relay F being energized by a circuit running from power line *a*, through wire *o*, wire *v*, wire 60, the lower contacts of resistor relays *g'*, *f'*, *e'*, wire 61, wire 62, wire 79, limit switch T, wire 80, transfer switch B, wire 81, contact plate *t7*, wire *u*, relay H, and wire *p* to power supply *b*. Relay D is energized by a circuit running from power line *a*, through wire *o*, wire *v*, wire 82, wire 83, limit switch T, wire 84, transfer switch B, wire 85, contact plate *t6*, wire *u*, relay H, and through wire *p* to the power-supply line *b*. Relays D and F, thus energized, effect the release of brake 48 and the counter-clockwise rotation of motor 11. The chain 8 is paid out by sprocket-wheel 10, and accordingly the drum 1 rolls downward on tracks 6.

It will be observed that, upon shifting the controller A to initiate the lowering of weir drum 1, all of the contact plates *t8*, *t9*, *t10* are united at once with the conductor *u*. Accordingly, the resistance units *e*, *f*, and *g* are all shorted out of the motor circuit *h* at the start of drum-lowering operation. As the weir drum lowers, it "overhauls" the motor 11—that is, it drives the motor as a generator. The resistance in the motor circuit being reduced to a practical minimum (by shunting out resistances *e*, *f*, *g*), it follows that the current, and consequent torque or drag, generated by the motor is maximum. As in lowering the drum gains momentum under the influence of gravity, the speed of the motor is correspondingly increased; as such speed of the motor is increased, the current and torque developed by the motor are proportionately increased, to create a progressively increasing drag upon the downward movement of the drum. Therefore, the motor 11, acting as a generator, automatically controls the acceleration of the weir drum in its downward movement.

As the drum approaches the lower limit of its range of travel, the limit switch T opens and deenergizes relays D, F. In consequence the motor 11 and brake 48 are deenergized, and the drum is stayed approximately six inches above the sill 55, Fig. I, upon which the drum seats. It may be remarked that it is advantageous to arrest the lowering of the drum at such point, to the end that the drum may be started from a position of rest a few inches from the sill 55 and slowly eased into engagement with the sill. To continue the lowering of the drum from the point of such arrest, the operator presses a push-button Y which by-passes the open limit switch T and again energizes relays D, F.

More specifically, upon pressing push-button Y, relays U and V are energized by a circuit consisting of power line *a*, wire *o*, wire 68, wire 86, push-button Y, wire 87, limit switch S, wire 88, wire 84, transfer switch B, wire 85, contact plate *t6*, wire *u*, relay H, and wire *p*, leading to power line *b*. The consequent shifting of the arms of relays U and V shunts out one pair of contacts of limit switch T by means of wire 89, wire 90, limit switch S, and wire 91; the other pair of contacts of limit switch T are shunted out by wire 92, wire 93, wire 87, limit switch S, and wire 88. The shunting out of the open limit switch T again effects the closing of relays D, F and the consequent release of brake 48 and the rotation of motor 11 to lower the drum. It will be perceived that, when the push-button Y has once been closed and the relays U and V energized, a circuit 94, running through the lower contacts of relay U, by-passes the push-button Y and holds the relays in energized condition. Additionally, it will be understood that the energizing of relay V disengages the lower pair of its contacts, and opens the wire 95, through which the resistor relays *g'*, *f'*, *e'* are energized. Therefore, the resistance units *g*, *f*, *e* cannot be shorted out of the motor-accelerating circuit, and the speed of the motor essentially is slow, to ease the drum 1 downward into place upon the sill 55. When the drum engages the sill, the limit switch S opens and all operation is terminated.

In the above description the flap 12 is assumed to be in closed position. However, it often happens that it is desirable to raise the drum with the flap open; that is, to adjust the drum with the flap 12 open in such manner that water may flow beneath the drum while the flap obstructs or partially obstructs flow at the crown of the drum. It will be understood, however, that, if the raising of the drum is continued with the flap in open position, the drum, in rolling on the tracks 6, will shift the flap to a position where the inner face of the flap is subjected on the down-stream side of the structure to the force of water rushing beneath the drum. To prevent the flap from being unintentionally so exposed to the under-rushing water, the limit switch N is effective. The limit switch N opens when the drum, with the flap open, moves upward an interval, which in this case is an interval of five feet, from the sill 55. The opening of limit switch N deenergizes relays E, F, and, consequently, the motor 11 stops and brake 48 is set. In cases of emergency, the drum may be elevated, with flap open, above the point normally determined by the limit switch N. To accomplish this unusual adjustment of the drum, a switch Z (normally held inoperative under lock and key) is closed, and closes the lines (63, 64, and *x*, *y*) which the limit switch N, in swinging open, had broken. When the flap 12 is closed, the limit switch P is in the upper of its two operative positions, and the lines 63, 64 and *x*, *y* manifestly are united, regardless of the positions of limit switch N and switch Z, so that, so long as the flap is closed, the raising of the drum may continue uninterrupted between the limits of its range of travel. It is to be understood that, when the flap is open, the limit switch P is in its illustrated position, and the limit switch N alone controls the union of lines 63, 64 and *x*, *y*.

It will be understood that, when the flap 12 is to be operated, the switch C and the controller A must be placed in their illustrated positions, before the magnet coil of relay H may be energized to close such relay, and it is necessary, as has been already shown, that such relay must be closed before the motor 11 may be energized. As has been already explained, when the switch C is in its illustrated position, the auxiliary circuit *r*, *s* (which in the alternate position of switch C is closed and by-passes overload relay G') is open, and in consequence the two relays G, G' are effective in the motor-energizing leads. Accordingly, the more sensitive relay G' is actually the effective relay, and serves to open the motor-energizing circuit when the current reaches the maximum amperage which may be supplied to the motor with safety to the flap-operating mechanism. When the switch and controller have been placed in such positions, the operator merely closes the knife switch K, to effect the closing of circuit *i*, *j*, *k*, *l*, *m*, *n*, *o*, and the consequent closing of relay H. The lever L is then swung into position L2, effecting the closing of clutch 44, 46 and the engagement of the arms of transfer switch B with its six contacts on the left (Fig. VIII). Next, the operator shifts the controller A in such direction as to move contact plates *t1* and *t2* into engagement with the drum fingers which are commonly connected by wire *u*, thus completing two circuits, one circuit running from power line *a*, through line *o*, line *v*, line 60, in series through the lower pair of contacts in each resistor relay *g'*, *f'*, *e'*, wire 61, magnet coil of the relay F, wire 62, wire 99, limit switch N, wire *h1*, limit switch R, wire *h2*, transfer switch B, wire 65, plate *t2*, wire *u*, relay H and wire *p* to power line *b*; the second circuit runs from power line *a*, wire *o*, wire *v*, wire 82, coil of relay D, wire 83, wire 92, wire *h3*, limit switch R, wire *h4*, limit switch N, wire *h5*, transfer switch B, wire *z*, contact plate *t1*, wire *u*, relay H, and wire *p* to power line *b*. Accordingly, the two relays D, F are energized and the motor 11 is energized for counterclockwise rotation, to rotate winch drum 17 clockwise, Fig. II, and to raise or open the flap 12. Simultaneously, with the energizing of the motor, the means for rendering brake 47 ineffective are energized and the brake is shifted to release position; the energizing circuit for brake 47 consists of leads *h6*, *h7*, 67, *r* and *s*, running respectively to the motor-energizing lines.

The operator now rotates the controller to move the contact plates *t3*, *t4*, *t5* successively into engagement with the controller contact fingers, whereby the resistor relays *g'*, *f'*, *e'* are successively closed and resistances *g*, *f*, *e* are successively shorted out of the rotor circuit *h*, and the motor is accelerated accordingly. Whereas in the drum operation described above, the switch C in its alternate position shorts the resistance unit *d* out of the rotor circuit, in the illustrated flap-operating position of the switch C the resistance unit *d* is not shorted out, but remains always in the rotor circuit; so that, during flap operation, the torque which the motor is capable of generating is much less than it is capable of generating during drum operation. This is an important feature of the invention. That is to say, a single motor is adapted to serve in two capacities, requiring motor-torque characteristics of widely different values—the torque which the motor is capable of generating during flap operation must be much less than the torque which the motor is required to generate during drum operation. The lower torque value, in this case, is essential to the safety of the flap-operating mechanism.

The flap-raising rotations of the motor 11 and of drum 17 continue until the flap reaches its fully opened position (cf. Fig. 1), whereupon the limit switch R comprising an element of the limit-switch mechanism 49 (cf. Figs. II and III), is opened and breaks the energizing circuits of the relays D, F. In consequence, the motor is deenergized and the brake 47 is applied. It will be noted that the energizing circuits for the relays D, F, to effect flap-raising operation, include the limit switch N, which switch N, as has been described above, opens when the weir drum 1 is raised to that point intermediate its range of travel beyond which the weir drum cannot safely be raised with the flap open. It will be understood, therefore, that the weir drum 1 must be in position below this critical point in its range of travel, to permit the energizing circuits of the relays D, F to be closed, in order to energize the motor for flap-raising operation.

Manifestly, to lower the flap, the transfer switches B and C remain in the positions last mentioned, and the under-voltage relay H remains closed. The operator rotates the controller A to move the contacts *t6–t10* into engagement with the drum fingers, thereby energizing relays E, F. A circuit running from power line *a* (through line *o*, line *v*, line 60, the lower contacts of the resistor relays *g'*, *f'*, *e'*, line 61, coil of relay F, wire 62, wire *h8*, limit switch P, wire *h9*, transfer switch B, wire 81, contact plate *t7*, wire *u*, relay H, and wire *p*) to power line *b* energizes the relay F; and a circuit running from power line *a* (through wire *o*, wire *v*, coil of relay E, wire *w*, wire *n1*, limit switch P, wire *n2*, transfer switch B, wire 85, contact plate *t6*, wire *u*, relay H, and wire *p*) to power line *b* energizes the relay E. Accordingly, the relays E, F being energized, the motor 11 is energized for clockwise rotation, the brake 47 is released, the winch drum 17 is rotated, and the flap 12 moves into closed position. When the flap 12 reaches fully closed position the limit switch P opens, interrupts the energizing of relays E, F, and so automatically terminates operation of the motor 11, and effects the shifting of brake 47 to applied position.

It will be perceived that the single motor 11 is adapted to serve effectively in double capacity. In one capacity the torque generated by the motor is much greater than in the other, and essentially so. And advantages of the nature indicated are obtained in the structure of my invention.

I claim as my invention:

1. In a drum weir, a drum adapted to roll along a predetermined course, which drum is equipped with a flap adapted to be raised and lowered, an electric motor including a rotary element, a source of electric energy, means for alternately imposing upon the rotary element of the motor from the source of electric energy torques of predetermined values and unequal magnitude, means for applying the motor torque of greater value to the rolling of the drum, and means for applying the motor torque of less value to the swinging of the flap.

2. In a drum weir, a drum adapted to roll along a predetermined course, which drum is equipped with a flap adapted to be raised and lowered, an electric motor including a rotary element, a source of electric energy, means for alternately imposing upon the rotary element of the motor torques of predetermined values and unequal magnitude, means for applying the motor torque of greater value to the rolling of the drum, and means for applying the motor torque of less value to the swinging of the flap, and overload means for severally limiting to unequal values the electric energy supplied to said motor in each of its said capacities.

3. In a drum weir, a drum adapted to roll along a predetermined course, which drum is equipped with a flap adapted to be raised and lowered, means for powerfully rolling said drum, and means for powerfully swinging said flap between raised and lowered positions, and means for automatically stopping at an intermediate point in its course of travel the rolling of said drum with its flap raised.

4. In a drum weir, a drum adapted to roll along a predetermined course, which drum is equipped with a flap adapted to be raised and lowered, means for powerfully rolling said drum, and means for powerfully swinging said flap between raised and lowered positions, and means for automatically stopping at an intermediate point in its course of travel the rolling of said drum with its flap raised, together with manually operated means serviceable in emergency for admitting of the powerful rolling of said drum, with its flap raised, past said point where drum movement is normally stopped.

5. In a drum weir, a drum adapted to roll upward and downward in a predetermined course, which drum is equipped with a flap adapted to be raised and lowered, means for powerfully rolling said drum and means for powerfully swinging said flap between raised and lowered positions, and means which become effective when said drum is positioned above a predetermined intermediate point in its course of travel for the prevention of flap-raising operation.

6. In a drum weir, a drum adapted to roll upward and downward in a predetermined course, which drum is equipped with a flap adapted to be raised and lowered, means for powerfully rolling said drum, and means for powerfully swinging said flap between raised and lowered positions, means for automatically stopping at an intermediate point in its course of travel the upward rolling of said drum while its flap is raised, and means preventing the powerful raising of the flap when said drum is positioned above said intermediate point.

7. In a drum weir, a drum adapted to roll upward and downward in a predetermined course, which drum is equipped with a flap adapted to be raised and lowered, means for powerfully rolling said drum, and means for powerfully swinging said flap between raised and lowered positions, and means effective during the operation of said flap-swinging means for automatically stopping the raising of said flap at a predetermined point.

8. In a drum weir, a drum adapted to roll upward and downward in a predetermined course, which drum is equipped with a flap adapted to be raised and lowered, means for powerfully rolling said drum, and means for powerfully swinging said flap between raised and lowered positions, means effective during flap operation for automatically stopping said flap in closed position, and means for automatically stopping said flap in a predetermined open position.

9. In a drum weir, a drum adapted to roll along a predetermined course, which drum is equipped with a flap adapted to be raised and lowered, means for powerfully rolling the drum, and means for powerfully swinging said flap between raised and lowered positions, means effective during flap operation for automatically stopping the flap at the opposite limits of its range of movement, and means effective during drum-rolling operation for automatically stopping the drum at a predetermined point at each of the opposite ends of its course of travel.

10. The combination of claim 9, together with means for automatically stopping at an intermediate point in its course of travel the rolling of said drum with its flap in raised position.

11. The combination of claim 9, together with means for automatically stopping at an intermediate point in its course of travel the rolling of said drum with its flap in raised position, and manually operated means for admitting of the rolling of said drum, with its flap in raised position, past said point where drum movement is normally stopped.

12. The combination of claim 9, together with means, which automatically become effective, when the drum is positioned above a predetermined intermediate point in its course of travel, for holding the flap-raising means in deenergized condition.

13. In a drum weir, a drum adapted to roll upward and downward in a predetermined course, means for powerfully rolling the drum, and means for automatically effecting the arrest of drum movement at a point within the limits of its course of travel, and manually controlled means for effecting drum movement beyond the point where, by the means previously defined, drum movement is automatically arrested.

14. In a drum weir, a drum adapted to roll upward and downward in a predetermined course, means for powerfully rolling the drum, and means for automatically effecting the arrest of drum movement at points immediately within the opposite limits of its course of travel, together with manually controlled means for effecting drum movement past the points where drum movement is thus automatically arrested.

15. In a drum weir, a drum adapted to roll upward and downward in a predetermined course, means for powerfully rolling the drum, means for automatically effecting the arrest of drum movement at a point within its limit of travel, manually controlled means for effecting drum movement beyond such point, and an automatic stop for limiting the further movement of the drum beyond said point.

16. In a drum weir, a drum adapted to roll upward and downward in a predetermined course, an electric motor for powerfully rolling the drum, a motor-energizing circuit, a resistance adapted to be included in the motor-energizing circuit, manually operable means for causing an energizing current to flow in drum-raising course through the motor and simultaneously through said resistance, manually operable means for causing an energizing current to flow in drum-lowering course through the motor, and automatic means for shunting said resistance out of circuit in response to flow of current in drum-lowering course, the motor being subject to overrunning in response to the acceleration under gravity of the descending drum.

BERNARD H. KERSTING.